UNITED STATES PATENT OFFICE.

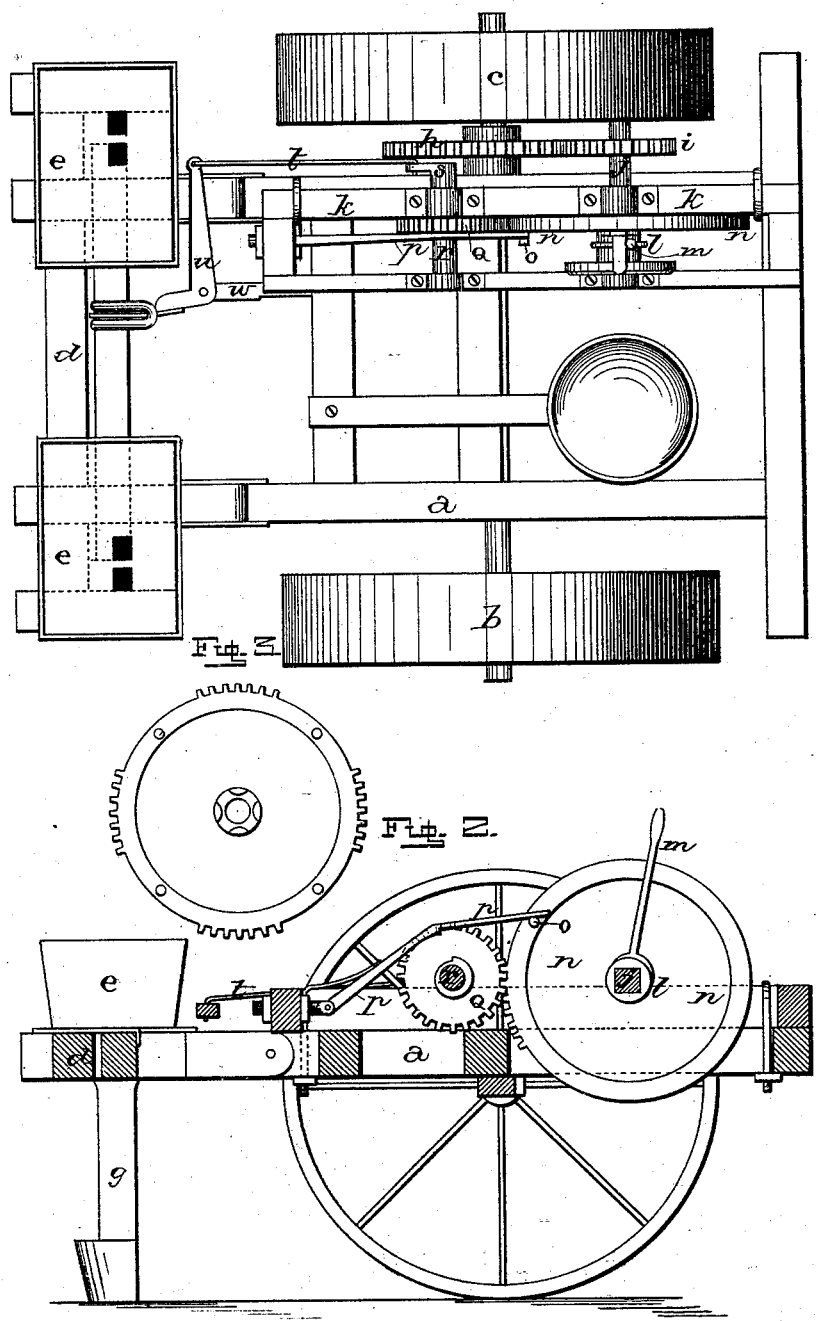

ALLEN WILBER, OF BELKNAP, IOWA, ASSIGNOR TO HIMSELF AND
J. S. HUFFMAN, OF SAME PLACE.

IMPROVEMENT IN CORN-PLANTERS.

Specification forming part of Letters Patent No. 203,305, dated May 7, 1878; application filed March 25, 1878.

*To all whom it may concern:*

Be it known that I, ALLEN WILBER, of Belknap, in the county of Davis and State of Iowa, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the combination of a wheel provided with a number of teeth upon its periphery for operating a pinion, which, in turn, operates a seed-slide, and a stud or studs upon one side, just in advance of the teeth upon its periphery, so that before the teeth engage with the pinion the stud lifts a lock or catch, so as to allow the pinion to revolve and operate the seed-slide, as will be more fully described hereinafter.

Figure 1 is a plan view of my invention. Fig. 2 is a vertical section of the same. Fig. 3 is a detail view.

$a$ represents a rectangular frame, of any desired construction, which is supported upon the two driving-wheels $b$ $c$, and which has the frame $d$, for the support of the seed-boxes $e$ and the furrow-openers $g$, pivoted to its front end. The driving-wheel $c$ has secured to its hub the large gear-wheel $h$, which meshes with the pinion $i$ upon the shaft $j$. This shaft $j$ is journaled upon the top of the small rectangular frame $k$, which is clamped upon the top of the frame $a$ at one side. This frame $k$ can be removed from the frame $a$ at will, or can be applied to the frame of most corn-planters now in use.

To the inner end of the shaft $j$ is secured the clutch $l$, which is operated by means of the lever $m$, and is used for gearing with the large wheel $n$, causing it to revolve with the shaft while the machine is passing over the field in the act of planting corn. This wheel $n$ has a number of cogs formed upon its periphery, upon one side only, where the corn is being planted in hills, and the rest of the periphery is left perfectly smooth. Where it is desired to drill the corn, these teeth will be arranged in four separate groups around the edge of the wheel, and a smooth space will be left between each group, so as to give the planting mechanism a temporary rest while passing from one group of teeth to the other.

Just in advance of each group of teeth is a stud, $o$, which lifts the spring-latch $p$ before the teeth come in contact with and operate the pinion $q$. This pinion is rigidly secured to the shaft $r$, which has the crank $s$ formed upon its outer end, and which revolves when the pinion is turned by the wheel $n$ sufficiently far around to operate the seed-slide and cause it to drop seed from both of the seed-boxes. This latch has a shoulder formed upon its under side, which catches upon the shoulders upon the shaft, and thus prevents the pinion from revolving more than half-way around.

By thus having the stud in advance of the teeth it will be seen that the spring-latch is first lifted so as to allow the pinion to revolve around, and then it instantly locks the pinion in position again, so as to prevent any further movement the moment after the teeth upon the wheel $n$ have left the teeth of the pinion.

At each half-revolution the crank $s$, through the connecting-rod $t$ and bell-crank lever $u$, moves the seed-slide in one direction, and causes the grain to be dropped. The bearing $w$, upon which the bell-crank lever is pivoted, is slotted, and can be adjusted back and forth, so as to cause the bell-crank lever to give the slide a longer or shorter movement, as may be found necessary.

By means of the combination and arrangement of parts above described I have produced an attachment which can be used for planting the corn in hills or drilling it, as may be desired, and which can be applied to any of the corn-planters now in use of which the two frames are constructed as here shown.

Having thus described my invention, I claim—

1. The combination of the wheel $n$, having teeth upon its periphery and a stud or studs upon its side, with a pinion which operates the seed-slide, and a latch or lock for allowing the pinion to revolve, substantially as shown.

2. The combination of the wheel $n$, having teeth upon its periphery and a stud or studs, $o$, upon its side, with a clutch, $l$, lever $m$, spring-latch $p$, pinion $q$, shaft $r$, having the shoulder or stops upon it, crank $s$, and connecting-rod and lever for operating the seed-slide, substantially as set forth.

In testimony that I claim the foregoing I have hereunto set my hand this 11th day of March, 1878.

ALLEN WILBER.

Witnesses:
 JOEL McGEE,
 E. W. RICHARDSON.